United States Patent Office 3,597,466
Patented Aug. 3, 1971

3,597,466
PREPARATION OF AROMATIC ISOCYANATES
Eric Smith, Madison, Conn., assignor to
Olin Mathieson Chemical Corporation
No Drawing. Filed Nov. 21, 1968, Ser. No. 777,867
Int. Cl. C07c 119/04
U.S. Cl. 260—453P
16 Claims

ABSTRACT OF THE DISCLOSURE

The process for preparing an organic isocyanate by reacting an organic nitro compound with carbon monoxide in the presence of a catalyst system comprising a halide of a noble metal and a cyanamide compound of the formula:

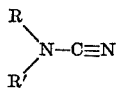

where R and R' are independently selected from the group consisting of hydrogen, and alkyl, aryl, etc. Preferred cyanamide compounds include alkyl, dialkyl, aryl, diaryl, aralkyl, and diaralkyl cyanamides. The noble metal halide is preferably a halide of palladium, rhodium, iridium, rhenium, platinum, and mixtures thereof. The catalyst system may also include molybdenum trioxide or another metal oxide.

---

This invention relates to an improved process for a preparation of organic isocyanates from organic nitro compounds in which a catalyst system comprising a halide of a noble metal and a cyanamide compound is utilized.

Organic isocyanates are used extensively in the preparation of urethane foams, coatings, and fibers, as well as in the preparation of insecticides, pesticides and the like. Commercial processes for preparing organic isocyanates utilize the catalytic hydrogenation of an organic nitro compound to form the corresponding amine, followed by reaction of the amine with phosgene to form the corresponding isocyanate. These processes are complex and expensive, and the need for a simplified, less expensive process is apparent.

In order to provide a simplified technique, it has been proposed to react an organic nitro compound with carbon monoxide in the presence of a catalyst. For example, British Pat. No. 1,025,436 discloses a process for preparing isocyanates from the corresponding nitro compounds by reacting an organic nitro compound with carbon monoxide in the presence of a noble metal-based catalyst. This process is not used commercially, because no more than trace amounts of organic isocyanates are formed when an organic nitro compound such as dinitrotoluene is reacted with carbon monoxide using a noble metal-based catalyst, such as rhodium trichloride, palladium dichloride, iridium trichloride, osmium trichloride and the like.

Other proposed simplified techniques utilize other catalyst systems. For example, Belgian Pat. No. 672,405 entitled "Process For The Preparation Of Organic Isocyanates," describes the use of a catalyst system of a noble metal and/or a Lewis acid in the reaction between an organic nitro compound with carbon monoxide. Unfortunately, the yield of organic isocyanate afforded by these simplified techniques has not been significant enough to justify their use on a commercial scale.

It is a primary object of this invention to provide an improved process for the preparation of organic isocyanates.

Another object of the invention is to provide a novel catalyst system useful in the direct conversion of organic nitro compounds to the corresponding organic isocyanates.

Still a further object is to provide an improved process for preparing aromatic isocyanates such as phenyl isocyanate, toluene diisocyanates, and isocyanato-nitrotoluenes.

These and other objects of the invention will be apparent from the following detailed description thereof.

It has now been discovered that the above-mentioned objects are accomplished when an organic nitro compound is reacted with carbon monoxide at an elevated pressure and elevated temperature in the presence of a catalyst system comprised of:

(A) at least one compound of the formula:

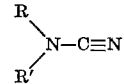

wherein R and R' are independently selected from the group consisting of:

(a) hydrogen
(b) alkyl
(c) aryl
(d) alkaryl
(e) aralkyl
(f) alkoxyaryl
(g) alkoxy
(h) aryloxy, and (B) at least one noble metal halide, or
(C) a complex of A and B.

In R and R' above, the alkyl and alkoxy groups contain between 1 and 8 carbon atoms, including methyl to octyl. The aryl and aryloxy moieties contain between 6 and 12 carbon atoms, such as phenyl, cresyl, naphthyl and the like. The alkaryl group contains 7 to 12 carbon atoms and includes tolyl, ethylphenyl, xylyl, mesityl, etc., while the aralkyl group contains 7 to 12 carbon atoms and includes benzyl, phenylethyl, etc. Alkoxyaryl moieties include ethoxyphenyl, propoxyphenyl, etc. The organic moieties referred to above may also contain halogen substituents such as chlorine, bromine and iodine.

Any organic nitro compound capable of being converted to an organic isocyanate may be employed as a reactant. Generally, aromatic, cycloaliphatic, and aliphatic mono- or polynitro compounds, which may be substituted, if desired, can be reacted to form the corresponding mono- or poly-isocyanates by the novel process of this invention. The term "organic nitro compound," is used throughout the description and claims to define unsubstituted as well as substituted organic nitro compounds of the type described herein. Typical examples of suitable organic nitro compounds which can be reacted to form isocyanates include the following:

(I) Aromatic nitro compounds (a) Nitrobenzene
(b) Nitronnaphtalenes
(c) Nitroanthracenes
(d) Nitrobiphenyls
(e) Bis(nitrophenyl)methanes
(f) Bis(nitrophenyl)ethers
(g) Bis(nitrophenyl)thioether
(h) Bis(nitrophenyl)sulfones
(i) Nitrodiphenoxy alkanes
(j) Nitrophenothiazines

(II) Nitrocycloalkanes (a) Nitrocyclobutane
(b) Nitrocyclopentane
(c) Nitrocyclohexane
(d) Dinitrocyclohexanes
(e) Bis(nitrocyclohexyl)methanes

(III) Nitroalkanes (a) Nitromethane
(b) Nitroethane
(c) Nitropropane
(d) Nitrobutanes
(e) Nitrohexanes
(f) Nitrooctanes
(g) Nitrooctadecanes
(h) Dinitroethane
(i) Dinitropropanes
(j) Dinitrobutanes
(k) Dinitrohexanes
(l) Dinitrodecanes
(m) Phenyl nitromethane
(n) Bromophenyl nitromethanes
(o) Nitrophenyl nitromethanes
(p) Methoxy phenyl nitromethanes
(q) Bis-(nitromethyl)cyclohexanes
(r) Bis-(nitromethyl)benzenes All of the aformentioned compounds may be substituted with one or more additional substituents such as nitro, nitroalkyl, alkyl, alkenyl, alkoxy, aryloxy, halogen, alkylthio, arylthio, carboxyalkyl, cyano, isocyanato, and the like, and employed as reactants in the novel process of this invention. Specific examples of suitable substituted organic nitro compounds which can be used are as follows:

(1) o-Nitrotoluene
(2) m-Nitrotoluene
(3) p-Nitrotoluene
(4) o-Nitro-p-xylene
(5) 2-methyl-1-nitronaphthalene
(6) m-Dinitrobenzene
(7) p-Dinitrobenzene
(8) 2,4-dinitrotoluene
(9) 2,6-dinitrotoluene
(10) Dinitromesitylene
(11) 4,4'-dinitrobiphenyl
(12) 2,4-dinitrobiphenyl
(13) 4,4'-dinitrodibenzyl
(14) Bis(p-nitrophenyl)methane
(15) Bis(2,4-dinitrophenyl)methane
(16) Bis(p-nitrophenyl)ether
(17) Bis(2,4-dinitrophenyl)ether
(18) Bis(p-nitrophenyl)thioether
(19) Bis(p-nitrophenyl)sulfone
(20) Bis(p-nitrophenoxy)ethane
(21) α,α'-Dinitro-p-xylene
(22) 2,4,6-trinitrotoluene
(23) 1,3,5-trinitrotobenzene
(24) 1-chloro-2-nitrobenzene
(25) 1-chloro-4-nitrobenzene
(26) 1-chloro-3-nitrobenzene
(27) 2-chloro-6-nitrotoluene
(28) 4-chloro-3-nitrotoluene
(29) 1-chloro-2,4-dinitrobenzene
(30) 1,4-dichloro-2-nitrobenzene
(31) alpha-Chloro-p-nitrotoluene
(32) 1,3,5-trichloro-2-nitrobenzene
(33) 1,3,5-trichloro-2,4-dinitrobenzene
(34) 1,2-dichloro-4-nitrobenzene
(35) alpha-Chloro-m-nitrotoluene
(36) 1,2,4-trichloro-5-nitrobenzene
(37) 1-bromo-4-nitrobenzene
(38) 1-bromo-2-nitrobenzene
(39) 1-bromo-3-nitrobenzene
(40) 1-bromo-2,4-dinitrobenzene
(41) α,α-Dibromo-p-nitrotoluene
(42) α-Bromo-p-nitrotoluene
(43) 1-fluoro-4-nitrobenzene
(44) 1-fluoro-2,4-dinitrobenzene
(45) 1-fluoro-2-nitrobenzene
(46) o-Nitrophenyl isocyanate
(47) m-Nitrophenyl isocyanate
(48) p-Nitrophenyl isocyanate
(49) o-Nitroanisole
(50) p-Nitroanisole
(51) p-Nitrophenetole
(52) o-Nitrophenetole
(53) 2,4-dinitrophenetole
(54) 2,4-dinitroanisole
(55) 1-chloro-2,4-dimethoxy-5-nitrobenzene
(56) 1,4-dimethoxy-2-nitrobenzene
(57) m-Nitrobenzaldehyde
(58) p-Nitrobenzaldhyde
(59) p-Nitrobenzoylchloride
(60) m-Nitrobenzoylchloride
(61) 3,5-dinitrobenzoylchloride
(62) Ethyl-p-nitrobenzoate
(63) Methyl-o-nitrobenzoate
(64) m-Nitrobenzenesulfonylchloride
(65) p-Nitrobenzenesulfonylchloride
(66) o-Nitrobenzenesulfonylchloride
(67) 4-chloro-3-nitrobenzenesulfonylchloride
(68) 2,4-dinitrobenzenesulfonylchloride
(69) 3-nitrophthalic anhydride
(70) p-Nitrobenzonitrile
(71) m-Nitrobenzonitrile
(72) 1,4-dinitrocyclohexane
(73) Bis(p-nitrocyclohexyl)methane
(74) 1-nitro-n-hexane
(75) 2,2-dimethyl-1-nitrobutane
(76) 1,6-dinitro-n-hexane
(77) 1,4-bis(nitromethyl)cyclohexane
(78) 3,3'-dimethoxy-4,4'-dinitro-biphenyl
(79) 3,3'-dimethyl-4,4'-dinitro-biphenyl In addition, isomers and mixtures of the aforesaid organic nitro compounds and substituted organic nitro compounds may also be employed, as well as homologues and other related compounds. Compounds which have both nitro and isocyanato substituents, such as 2-isocyanato-4-nitrotoluene, may also be employed as a reactant.

The process of this invention is particularly effective in the conversion of aromatic nitro compounds to organic isocyanates. As used herein, the term "aromatic nitro compounds" represents those aromatic nitro compounds having at least one nitro group attached directly to an aromatic hydrocarbon nucleus, such as benzene, naphthalene, and the like, wherein the aromatic hydrocarbon nucleus may be substituted as illustrated above. Among the preferred organic nitro compounds which may be used in the practice of this invention are the nitrobenzenes, both mono- and polynitro, including the various nitrated toluenes and the nitrated xylenes; nitrated biphenyl and nitrated diphenylmethylene. Other preferred reactants include bis(nitrophenoxy)alkylenes and bis-(nitrophenoxy)alkyl ethers. Generally, the organic nitro compounds and substituted organic nitro compounds contain between 1 and about 20 carbon atoms, and preferably between about 6 and about 14 carbon atoms.

The catalyst system of this invention is comprised of at least one cyanamide compound and at least one noble metal halide. The cyanamide compound is one having the formula:

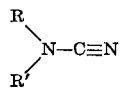

wherein R and R' have the same meaning as previously defined.

Example of cyanamide compounds useful in the catalyst of this invention include:

Alkyl cyanamides

Methyl cyanamide
Ethyl cyanamide
n-Propyl cyanamide
Isopropyl cyanamide
n-Butyl cyanamide
n-Amyl cyanamide
Isoamyl cyanamide
n-Hexyl cyanamide
Isohexyl cyanamide
n-Heptyl cyanamide
Isooctyl cyanamide
Dimethyl cyanamide
Diethyl cyanamide
n-Dipropyl cyanamide
Diisopropyl cyanamide
n-Dibutyl cyanamide
n-Diamyl cyanamide
Diisoamyl cyanamide
n-Dihexyl cyanamide
Diisohexyl cyanamide
n-Diheptyl cyanamide
Diisooctyl cyanamide

Aryl cyanamides

Phenyl cyanamide
Biphenyl cyanamide
Naphthyl cyanamide
Ditolyl cyanamide
Dixylyl cyanamide
Dinaphthyl cyanamide

Alkaryl cyanamides

Methylphenyl cyanamide
n-Propylphenyl cyanamide
Isoamylphenyl cyanamide
Tolyl cyanamide
Xylyl cyanamide
Ditolyl cyanamide

Aralkyl cyanamides

Benzyl cyanamide
Phenylethyl cyanamide
Di(phenylethyl)cyanamide
Di(phenylpropyl)cyanamide
Phenylbutyl cyanamide

Alkoxyaryl cyanamides

Methoxyphenyl cyanamide
Ethoxyphenyl cyanamide
n-Butoxyphenyl cyanamide
Di(methoxyphenyl)cyanamide
Di(ethoxyphenyl)cyanamide
Di(n-propoxyphenyl)cyanamide

Alkoxy cyanamides

Methoxy cyanamide
Ethoxy cyanamide
n-Butoxy cyanamide
Dimethoxy cyanamide
Diisopropoxy cyanamide

Aryloxy cyanamides

Phenoxy cyanamide
Tolyloxy cyanamide
Xyloxy cyanamide
Diphenoxy cyanamide
Ditholoxy cyanamide In the process of this invention certain selected cyanamide compounds of the formula:

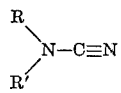

wherein R and R' have the same meaning as previously described, have been found to be particularly efficacious when used with the noble metal halides. On such groups of cyanamide compounds includes alkyl and dialkyl cyanamides, aryl and diaryl cyanamides, and aralkyl and diaralkyl cyanamides. Especially useful cyanamide compounds falling within this classification include:

Dimethyl cyanamide
Ethyl cyanamide
Di-n-propyl cyanamide
Diphenyl cyanamide
Dibenzyl cyanamide The second component of the catalyst system is at least one halide of a noble metal. Noble metals include ruthenium, rhenium, rhodium, palladium, osmium, iridium, platinum, silver and gold. The halides of palladium, rhodium, platinum, iridium, rhenium and mixtures thereof are particularly preferred noble metal halides. Typical examples of suitable halides include palladous bromide, palladous chloride, palladous fluoride, palladous iodide, rhodium tribromide, rhodium trichloride, rhodium trifluoride, rhodium triiodide; ruthenium dichloride, ruthenium trichloride, ruthenium tetrachloride; osmium dichloride, osmium trichloride, osmium tetrachloride; platinic bromide, platinous bromide, platinic chloride, platinous chloride, platinic fluoride, platinous iodide, platinic iodide, rhenium trichloride, rhenium tetrachloride, iridium tribromide, rhenium hexafluoride, rhenium tribromide, iridium tribromide, iridium tetrabromide, iridium triiodide, iridium tetraiodide, and mixtures thereof. An especially useful group of noble metal halides includes palladous chloride, rhodium trichloride, iridium trichloride, platinic chloride, and mixtures thereof. Oxides of the noble metals may also be employed and the term "halide of a noble metal" as used throughout the description and claims is intended to include the above mentioned noble metal halides as well as the corresponding oxides, such as palladium oxide, rhodium oxide, platinum oxide, etc., and the like.

The use of the cyanamide compound in catalytic combination with the noble metal halide is generally accomplished by adding the cyanamide compound and the noble metal halide separately to the reaction system or, if desired, they may be premixed prior to adding the organic nitro compound. However, it has also been determined that complexes which can be formed by reacting the noble metal halide and the cyanamide compound also can be utilized very effectively as the catalyst system in the conversion of the nitro compounds to isocyanates with carbon monoxide. These complexes are conveniently prepared by the reaction of the aryl halo compound with the previously recited noble metal halides. For example, two moles of diphenyl cyanamide dissolved in ortho-dichlorobenzene are stirred and refluxed with one mole of palladous chloride until the latter dissolves. The solvent is then removed by vacuum distillation, leaving behind crystals of bis(diphenyl cyanamide) palladous chloride. Thus, it is to be understood that in the practice of this invention the use of the cyanamide compound in combination with the use of the noble metal halide may involve either the separate addition of each to the reaction system or, if desired, the prior formation of a complex of the two materials and subsequent use thereof in the reaction.

The catalyst system can be self-supported or deposited on a support or carrier for dispersing the catalyst system to increase its effective surface. Alumina, silica, carbon, barium sulfate, calcium carbonate, asbestos, bentonite, diatomaceous earth, fuller's earth, and analogous materials are useful as carriers for this purpose.

The reaction is carried out in the presence of a catalytic proportion of the catalyst system. The proportion of catalyst system is generally equivalent to between about 0.001 and about 500 percent, and preferably between about 1 and about 100 percent by weight of the organic nitro compound. However, greater or lesser proportions may be employed if desired.

The molar ratio of cyanamide compound to the noble metal halide is generally between about 0.05 and about 10 and preferably between about 0.2 and about 5 but greater or lesser ratios may be employed if desired.

The process of this invention operates effectively in the absence of a solvent, but improved overall yields of the organic isocyanates can be obtained when a solvent which is chemically inert to the components of the reaction system is employed. Suitable solvents include aliphatic, cycloaliphatic and aromatic solvents such as n-heptane, cyclohexane, benzene, toluene, and xylene, and halogenated aliphatic and aromatic hydrocarbons such as dichloromethane, tetrachloroethane, trichlorotrifluoroethane, monochloronaphthalene, monochlorobenzene, dichlorobenzene, trichlorobenzene, and perchloroethylene, as well as sulfur dioxide, mixtures thereof and the like.

The proportion of solvent is not critical and any proportion may be employed which will not require excessively large equipment to contain. Generally the weight percent of organic nitro compound in the solvent is in the range between about 5.0 and about 75 percent, but greater or lesser proportions may be employed if desired.

The order of mixing the reactants is not critical and may be varied within the limitations of the equipment employed. In one embodiment, the organic nitro compound, catalyst system, and if desired, solvent, is charged to a suitable pressure vessel such as an autoclave which was previously purged with nitrogen, and which is preferably provided with agitation means such as a stirrer or an external rocking mechanism. At start-up, carbon monoxide is fed into the autoclave until a pressure is attained, at ambient temperature which is generally between about 30 and about 10,000 p.s.i.g. After the reaction proceeds and heat is applied, the pressure may increase to as high as 30,000 p.s.i.g. The preferred reaction pressure is between about 100 and about 20,000 p.s.i.g. However, greater or lesser pressures may be employed if desired.

Generally the quantity of carbon monoxide in the free space of the reactor is sufficient to maintain the desired pressure as well as provide reactant for the process, as the reaction progresses. If desired, additional carbon monoxide can be fed to the reactor either intermittently or continuously as the reaction progresses. The reaction is believed to progress in accordance with the following equation:

(I)  $R(NO_2)_n + 3nCO \rightarrow R(NCO)_n + 2nCO_2$ where R is the organic moiety of the organic nitro compound reactant of the type defined above, and $n$ is the number of nitro groups in the organic nitro compound. The total amount of carbon monoxide added during the reaction is generally between about 3 and about 50 and preferably between about 8 and about 15 moles of carbon monoxide per nitro group in the organic nitro compound. Greater or lesser amounts may be employed if desired. The highest carbon monoxide requirements are generally utilized in a process in which the carbon monoxide is added continuously, but suitable recycle of the carbon monoxide containing gas streams greatly reduces the overall consumption of carbon monoxide.

The reaction temperature is generally maintained above about 25° C. and preferably between about 100 and about 250° C. Interior and/or exterior heating and cooling means may be employed to maintain the temperature within the reactor within the desired range.

The reaction time is dependent upon the organic nitro compound being reacted, temperature, pressure, and on the amount of catalyst being charged, as well as the type of equipment being employed. Usually between one-half hour and 20 hours are required to obtain the desired degree of reaction, in a batch technique, but shorter or longer reaction times may be employed. In a continuous process, the reaction time may be much lower, i.e., substantially instantaneous, and residence time may be substantially less than batch reaction time.

The reaction can be carried out batchwise, semicontinuously or continuously.

After the reaction is completed, the temperature of the crude reaction mixture may be dropped to ambient temperature, the pressure vessel is vented, and the reaction products are removed from the reaction vessel. Filtration or other suitable solid-liquid separation techniques may be employed to separate the catalyst from the reaction product and fractional distillation is preferably employed to isolate the organic isocyanate from the reaction product. However, other suitable separation techniques such as extraction, sublimation, etc., may be employed to separate the organic isocyanate from the unreacted organic nitro compound and any by-products that may be formed.

Organic isocyanates produced in accordance with the technique of this invention are suitable for use in preparing polyurethane compositions such as foams, coatings, fibers and the like by reacting the organic isocyanate with a suitable polyether polyol in the presence of a catalyst and, if desired, a foaming agent. In addition, the organic isocyanates may be used in the preparation of biologically active compounds.

Some improvement in the conversion and yield of organic isocyanates can be obtained by employing a catalyst system which not only contains a cyanamide compound and a noble metal halide but also contains a third component comprised of certain metal oxides. Oxides suitable as a third component of the catalyst system include at least one oxide of an element selected from the group consisting of vanadium, molybdenum, tungsten, niobium, chromium, tantalum, and iron, as described in co-pending application Ser. No. 619,158, filed Feb. 28, 1967, for Process, by Schnabel et al. and Ser. No. 757,105, filed Sept. 3, 1968, for Noble Metal Catalyst System Containing Oxide of Iron by Rao et al. These elements, with the exception of iron, are found in Groups V$a$ and VI$a$ of the Periodic Table. Suitable oxides of this type include chromic oxide ($Cr_2O_3$), chromium dioxide ($CrO_2$), chromous oxide (CrO); molybdenum sesquioxide ($Mo_2O_3$); niobium monoxide (NbO), niobium oxide ($NbO_2$) and niobium pentoxide ($Nb_2O_5$); tantalum dioxide ($Ta_2O_2$), tantalum tetraoxide ($Ta_2O_4$), and tantalum pentoxide ($Ta_2O_5$); tungstic oxide ($WO_2$), and tungstic trioxide ($WO_3$); vanadium dioxide ($V_2O_2$), vanadium trioxide ($V_2O_3$), vanadium tetraoxide ($V_2O_4$), vanadium pentoxide ($V_2O_5$), ferrous oxide (FeO) and ferric oxide ($Fe_2O_3$). Mixtures of two or more of these oxides may be employed as one component of the catalyst mixture. The proportion of the third component of the catalyst system, when one is employed, is generally equivalent to a weight ratio of the noble metal halide to the metal oxide in the catalyst system generally in the range between about 0.001:1 and about 25:1, and preferably in the range between about 0.005:1 and about 5:1.

The following examples are presented to describe the invention more fully without any intention of being limited thereby. All parts and percentages are by weight unless otherwise specified.

EXAMPLE I

In this example, 2,4-dinitrotoluene (5.0 g.), palladous chloride (0.4 g., 2.26×10⁻³ moles) and dimethyl cyanamide (0.39 g., 5.52×10⁻³ moles) were charged to a clean, 100 ml. stainless steel autoclave (316 grade) together with orthodichlorobenzene solvent (5 ml.).

The autoclave was sealed after being so charged, then pressured with nitrogen and tested for leaks. Nitrogen was released and the autoclave was pressured with carbon monoxide to about 2500 p.s.i.g. During the reaction the autoclave was rocked in a rocker (36 cycles per minute), and heated during one hour to 190° C., when the internal pressure rose to about 3800 p.s.i.g. This temperature was maintained for three hours, and then reduced to ambient temperature. After venting, the contents were discharged and weighed, and the autoclave was rinsed with two 5 ml. portions of orthodichlorobenzene. Insoluble matter present (unreacted catalyst or solids formed during the reaction) was filtered from the reaction mixture and washed with dichlorobenzene, and then ether. The wash solutions were combined with the filtrate and the resulting solution was subjected to a determination of its infrared spectrum to test for the presence of isocyanates (which possess a characteristic infrared light absorption at about 4.5 microns). The weight percentages of 2,4-dinitrotoluene, 2,4-toluene diisocyanate, 2-isocyanato-4-nitrotoluene and 4-isocyanato-2-nitrotoluene in the filtrate were determined by vapor phase chromatography. The conversion of 2,4-dinitrotoluene was calculated to be 90 percent. The yield of 2,4-toluene diisocyanate and the combined yield of mononitrotolyl isocyanates were calculated and corrected for the amount of 2,4-dinitrotoluene which was recovered. The yield of toluene diisocyanate was 4 percent and the total yield of isocyanate products was 27 percent.

EXAMPLES II–V

The procedure of Example I was repeated except that the catalyst system employed was varied as shown in Table 1. Other pertinent details are also given in Table 1 which follows:

TABLE 1

| Example: | Catalyst | | | Moles of cyanamide compound/ mole noble metal halide | Conversion | Percent yield | |
|---|---|---|---|---|---|---|---|
| | Noble metal halide | Percent by weight [1] | Cyanamide compound | | | TDI [2] | Total product [3] |
| II | PdCl$_2$ | 8 | Dimethyl cyanamide | 2:1 | 82 | 6 | 29 |
| III | RhCl$_3$ | 8 | do | 3:1 | 35 | 0 | 3 |
| IV | PdCl$_2$ | 8 | Dibenzyl cyanamide | 2:1 | 60 | 4 | 23 |
| V | PdCl$_2$ | 8 | do | 2:1 | 61 | 0 | 7 |

[1] Based on weight of 2,4-dinitrotoluene employed which was 5 grams in all examples.
[2] 2,4-toluene diisocyanate.
[3] Total isocyanate product, including monoisocyanato-mononitro compounds.

EXAMPLES VI–X

The general procedure of Example I was repeated with the exception that palladous chloride and the dimethyl cyanamide were replaced with the following catalyst systems:

| Example: | Catalyst system (Catalyst complex) |
|---|---|
| VI | Pd(diphenylcyanamide)$_2$Cl$_2$. |
| VII | Rh(benzylcyanamide)$_3$Cl$_3$. |
| VIII | Pd(ethylcyanamide)$_2$Cl$_4$. |
| IX | Ir(n-propylcyanamide)$_3$Cl$_3$. |
| X | Ir(dibenzylcyanamide)$_3$Cl$_3$. |

In each example, the yield of isocyanate was improved over that obtained with the noble metal catalyst alone.

What is claimed is:

1. In the process for preparing an aromatic isocyanate by reacting an aromatic nitro compound containing up to about 20 carbon atoms with carbon monoxide at an elevated temperature and an elevated pressure in the presence of a catalyst, the improvement which comprises employing as said catalyst, a catalytic proportion of a catalyst system selected from the group consisting of
   (I) a mixture of
      (A) at least one cyanamide compound of the formula:

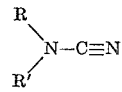

wherein R and R' are independently selected from the group consisting of:
   (a) hydrogen
   (b) alkyl
   (c) aryl
   (d) alkaryl
   (e) aralkyl
   (f) alkoxyaryl
   (g) alkoxy
   (h) aryloxy,
wherein each alkyl contains from 1 to about 8 carbon atoms and each aryl contains from 6 to about 10 carbon atoms, and
      (B) a noble metal compound selected from the group consisting of noble metal halides and noble metal oxides, wherein the noble metal of said noble metal compound is selected from the group consisting of palladium, rhodium, iridium, platinum, rhenium, ruthenium and mixtures thereof, and
   (II) a complex of a cyanamide of I–A and a noble metal compound of I–B,
   (III) wherein the molar ratio of said cyanamide compound to said noble metal compound in said catalyst system is in the range between about 0.05:1 and about 10:1.

2. The process of claim 1 wherein the molar ratio of said cyanamide compound to said noble metal compound is in the range between about 0.2:1 and about 5:1.

3. The process of claim 1 wherein the proportion of said catalyst system is between about 0.001 and about 500 weight percent of said aromatic nitro compound.

4. The process of claim 1 wherein the proportion of said catalyst system is between about 1 and about 100 weight percent of said aromatic nitro compound.

5. The process of claim 1 wherein said aromatic nitro compound is selected from the group consisting of nitrobenzene, dinitrotoluene and isocyanato-nitrotoluene.

6. The process of claim 5 wherein said catalyst system contains a third component comprised of an oxide of a metal selected from the group consisting of vanadium, molybdenum, tungsten, niobium, chromium, tantalum and iron.

7. The process of claim 6 wherein said noble metal compound is selected from the group consisting of palladous chloride, rhodium trichloride, iridium trichloride, rhenium trichloride, platinic chloride and mixtures thereof.

8. The process of claim 7 wherein said cyanamide compound is selected from the group consisting of dimethyl cyanamide, ethyl cyanamide, di-n-propyl cyanamide, diphenyl cyanamide and dibenzyl cyanamide.

9. The process of claim 8 wherein said aromatic nitro compound is selected from the group consisting of nitrobenzene, dinitrotoluene and isocyanato-nitrotoluene.

10. The process of claim 9 wherein said catalyst system is palladous chloride and dimethyl cyanamide.

11. The process of claim 9 wherein said catalyst system is palladous chloride and dibenzyl cyanamide.

12. The process of claim 9 wherein said catalyst system is rhodium trichloride and dimethyl cyanamide.

13. The process of claim 9 wherein said catalyst system is rhodium trichloride and dibenzyl cyanamide.

14. The process of claim 9 wherein said catalyst system is palladous chloride and diphenyl cyanamide.

15. The process of claim 9 wherein said catalyst system contains a third component comprised of an oxide of a metal selected from the group consisting of vanadium, molybdenum, tungsten, niobium, chromium, tantalum and iron.

16. The process of claim 15 wherein said oxide of a metal is selected from the group consisting of chromic oxide ($Cr_2O_3$), chromium dioxide ($CrO_2$), and chromous oxide ($CrO$); molybdenum sesquioxide ($Mo_2O_3$), molybdenum dioxide ($MoO_2$), and molybdenum trioxide ($MoO_3$)

niobium monoxide (NbO), niobium oxide ($NbO_2$), and niobium pentoxide ($Nb_2O_5$); tantalum dioxide ($Ta_2O_2$); tantalum tetraoxide ($Ta_2O_4$), and tantalum pentoxide ($Ta_2O_5$); tungstic oxide ($WO_2$), and tungstic trioxide ($WO_3$); vanadium dioxide ($V_2O_2$), vanadium trioxide ($V_2O_3$), vanadium tetraoxide ($V_2O_4$), vanadium pentoxide ($V_2O_5$), and mixtures thereof.

References Cited
UNITED STATES PATENTS 3,461,149    8/1969    Hardy et al. _____ 260—453

CHARLES B. PARKER, Primary Examiner

D. H. TORRENCE, Assistant Examiner

U.S. Cl. X.R.

252—428, 429A, 429C, 431N; 260—243A, 346.3, 465D, 476R, 551C, 689